(12) United States Patent
Zhang et al.

(10) Patent No.: US 8,917,710 B2
(45) Date of Patent: *Dec. 23, 2014

(54) PROCESS METHOD ABOUT THE SERVICE CONNECTION BETWEEN THE WIRELESS LOCAL AREA NETWORK AND USER TERMINAL

(71) Applicant: Huawei Technologies Co., Ltd., Shenzhen, Guangdong (CN)

(72) Inventors: Wenlin Zhang, Shenzhen (CN); Zhiming Li, Shanghai (CN); Xiaoqin Duan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,453

(22) Filed: May 20, 2013

(65) Prior Publication Data

US 2013/0329713 A1 Dec. 12, 2013

Related U.S. Application Data

(63) Continuation of application No. 11/869,622, filed on Oct. 9, 2007, now Pat. No. 8,503,412, which is a continuation of application No. 11/146,288, filed on Jun. 6, 2005, now Pat. No. 7,298,726, which is a continuation of application No. PCT/CN03/00921, filed on Oct. 30, 2003.

(30) Foreign Application Priority Data

Nov. 12, 2002 (CN) .................................. 02 1 48379
Dec. 12, 2002 (CN) .................................. 02 1 54432

(51) Int. Cl.
*H04W 4/00* (2009.01)
*H04W 76/02* (2009.01)
*H04W 60/00* (2009.01)
*H04W 84/12* (2009.01)

(52) U.S. Cl.
CPC ............ *H04W 76/021* (2013.01); *H04W 60/00* (2013.01); *H04W 84/12* (2013.01)
USPC ............................ 370/338; 370/328; 370/401

(58) Field of Classification Search
USPC .............. 370/328, 329, 352, 389, 395.2, 400, 370/401; 455/432.3, 433, 434, 435.1
See application file for complete search history.

(56) References Cited

U.S. PATENT DOCUMENTS 6,058,308 A 5/2000 Kallin et al.
6,104,929 A 8/2000 Josse et al.
(Continued)

FOREIGN PATENT DOCUMENTS

CN 1365580 A 8/2002
CN 001499778 A 5/2004
(Continued)

OTHER PUBLICATIONS

3GPP TSG-SA2-WLAN-SWG; S2-031867; Huawei Technologies; WLAN Access Authorization concept clarification; Agenda Item: WLAN; San Diago, USA; May 12-16, 2003; total 3 pages.

(Continued)

*Primary Examiner* — Dady Chery
(74) *Attorney, Agent, or Firm* — Leydig, Voit & Mayer, Ltd.

(57) ABSTRACT

A method for processing a service connection between a user terminal and a Wireless Local Area Network (WLAN) is provided. A WLAN interactive network includes at least a WLAN user terminal, a WLAN access unit, a service control unit and a user information storage unit. The method includes setting flags that represent the attached or detached status of the service connection between the user terminal and the WLAN in the WLAN user terminal and the service control unit respectively; and establishing or canceling the connection between the user terminal and the network through the interaction between the WLAN user terminal and the WLAN, meanwhile modifying the corresponding flags.

14 Claims, 5 Drawing Sheets

(56) References Cited

U.S. PATENT DOCUMENTS

| | | |
|---|---|---|
| 6,259,925 B1 | 7/2001 | Josse |
| 6,363,253 B1 | 3/2002 | Valentine et al. |
| 6,477,375 B1 | 11/2002 | Ho et al. |
| 6,505,044 B1 | 1/2003 | Back et al. |
| 6,985,446 B1 | 1/2006 | Hurtta et al. |
| 7,107,055 B2 | 9/2006 | Gallagher et al. |
| 7,116,970 B2 | 10/2006 | Brusilovsky et al. |
| 7,142,875 B2 | 11/2006 | Kall et al. |
| 7,155,526 B2 | 12/2006 | Chaudhary et al. |
| 7,953,407 B1 | 5/2011 | Maekipaeae |
| 2001/0041594 A1 | 11/2001 | Arazi et al. |
| 2002/0085540 A1 | 7/2002 | Hyvarinen et al. |
| 2002/0098840 A1 | 7/2002 | Hanson et al. |
| 2002/0123346 A1 | 9/2002 | Fukasawa et al. |
| 2002/0147008 A1 | 10/2002 | Kallio |
| 2004/0066769 A1 | 4/2004 | Ahmavaara et al. |
| 2005/0239461 A1 | 10/2005 | Verma et al. |
| 2006/0245399 A1 | 11/2006 | Holur et al. |

FOREIGN PATENT DOCUMENTS

| | | |
|---|---|---|
| JP | 10327199 A | 12/1998 |
| JP | 2000349787 A | 12/2000 |
| JP | 2001274809 A | 10/2001 |
| JP | 2002198971 A | 7/2002 |
| JP | 2002527962 A | 8/2002 |
| JP | 2002290480 A | 10/2002 |
| WO | 9916266 A1 | 4/1999 |
| WO | 0021310 A1 | 4/2000 |
| WO | 02054677 A1 | 7/2002 |
| WO | 02073892 A1 | 9/2002 |
| WO | 02093689 A1 | 11/2002 |

OTHER PUBLICATIONS

3GPP TS 23.234 V6.6.0; 3rd Generation Partnership Project; Technical Specification Group Services and System Aspects; 3GPP system to Wireless Local Area Network (WLAN) interworking; System description; Release 6; Sep. 2005; total 80 pages.

3GPP TS 23.234 V1.0.0; 3rd Generation Partnership Project; Technical Specification Group Services and System Aspects; WLAN Subsystem; System Description; Release 6; Sep. 2002; total 36 pages.

3GPP TSG-SA2 Meeting #28; S2-023515; WLAN Convenor; WLAN drafting session minutes; Bangkok, Thailand, Nov. 11-15, 2002; total 12 pages.

3GPP TSG-SA2 Meeting #28; S2-023265; Fujitsu; WLAN—Session termination procedure; Agenda Item: 9.6; Bangkok Thailand, Nov. 11-15, 2002; total 2 pages.

3GPP TSG SA2 #28; S2-023518; Huawei Tech, China Mobile; WLAN Inter-working: Purge Procedure; Agenda Item: 9.6(WLAN); Bangkok Thailand, Nov. 11-15, 2002; total 4 pages.

3GPP TSG SA2 #28; S2-023399; Nokia; Signalling Sequence: Disconnecting a Subscriber by WLAN; Agenda Item: 9.6; Bangkok Thailand, Nov. 11-15, 2002; total 1 pages.

3G TS 23.002 V3.5.0; 3rd Generation Partnership Project; Technical Specification Group Services and Systems Aspects; Network architecture; Release 1999; Jan. 2002; total 37 pages.

Junbiao Zhang et al: Virtual Operator based AAA in Wireless LAN Hot Spots with Ad-hoc Networking Support; Mobile Computing and Communications Review, vol. 6, No. 3; New York, NY, US; Jul. 2002; total 12 pages.

3GPP TSG SA2 #31; S2-031254; Attachment of WLAN UE to the 3gpp network; Huawei, China Mobile; Agenda item: 11.3 (WLAN); Seoul, Korea, Apr. 7-11, 2003; total 3 pages.

Muhammad Jaseemuddin: An Architecture for Integrating UMTS and 802.11 WLAN Networks; Computers and Communication, 2003; Proceedings: Eighth IEEE International Symposium on Jun. 13-Jul. 3, 2003; Piscataway, NJ, USA, IEEE, 2003; XP010646102; total 7 pages.

Draft 3GPP TS 23.234 V1.10.0; 3rd Generation Partnership Project; Technical Specification Group Services and System Aspects; 3GPP System to Wireless Local Area Network(WLAN); Interworking; System Description; Release 6; May 2003; total 194 pages.

IEEE Std 802.11b-1999 (Supplement to ANSI/IEEE Std 802.11, 1999 Edition); Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; IEEE-SA Standards Board; Sep. 16, 1999; total 97 pages.

IEEE Std 802.11a-1999 (Supplement to IEEE Std 802.11-1999); LAN/MAN Standards Committee of the IEEE Computer Society; IEEE-SA Standards Board; Part 11: Wireless LAN Medium Access Control (MAC) and Physical Layer (PHY) specifications: High-speed Physical Layer in the 5 GHZ Band; Sep. 16, 1999; total 90 pages.

Jon Postel: Internet Protocol, DARPA Internet Program, Protocol Specification; prepared for Defense Advanced Research Projects Agency, Information Processing Techniques Office;by Information Sciences Institute University of Southern California; Sep. 1981; total 50 pages.

ETSI TR 101 957 V1.1.1; Broadband Radio Access Networks (BRAN); HIPERLAN Type 2; Requirements and Architectures for Interworking between HIPERLAN/2 and 3rd Generation Cellular systems; Aug. 2001; total 56 pages.

ETSI TR 101 683 V1.1.1; Broadband Radio Access Networks (BRAN); HIPERLAN Type 2; System Overview; Feb. 2000; total 19 pages.

Specification of the Bluetooth System; Specification vol. 1; Version 1.1; Feb. 22, 2001; total 1084 pages.

IEEE Std 802.1X-2001; IEEE Standard for Local and metropolitan area networks—Port-Based Network Access Control; LAN/MAN Standards Committee of the IEEE Computer Society; IEEE-SA Standards Board; American National Standards Institute; Oct. 25, 2001; total 142 pages.

3GPP TS 22.234 V2.0.0; 3rd Generation Partnership Project; Technical Specification Group Services and System Aspects; Requirements on 3GPP system to Wireless Local Area Network (WLAN) interworking; Release 6; Mar. 2004; total 10 pages.

Stephen McCann: IEEE P802.11; Wireless LANs; Proposed Interworking Draft Skeleton; Draft Amendment to Standard for Telecommunications and Information Exchange Between Systems—LAN/MAN Specific Requirements—Part 11: Wireless Medium Access Control (MAC) and physical layer (PHY) specifications: Specification for Interworking; Jul. 21, 2003; total 17 pages.

Hiroyoahi Takamiya et al.; An implementation of parallel processing system on UNIX network; School of Sci. and Eng., Wasada Univ, Sarion Systems Research; total 10 pages.

"Flag(computing)", entry in the Internet dictionary Wikipedia at URL address http://en.wikipedia.org/wiki/Flag_(computing), entry was last modified on Dec. 8, 2009, printed on Mar. 5, 2010; total 1 pages.

"Das grosse Computer-Lexikon:die Welt der Computer von A bis Z leicht verstandlich erklart", Hartmut Woerrlein und Thomas Kaltenbach, Markt und Technik Verlag, Haar bei Munchen, AKtualisierte Neuauflage Oktober 1998, ISBN 3-87791-733-X, Seiten 185 und 437; total 3 pages.

PROCESS METHOD ABOUT THE SERVICE CONNECTION BETWEEN THE WIRELESS LOCAL AREA NETWORK AND USER TERMINAL

CROSS-REFERENCE TO RELATED APPLICATIONS

This application is a continuation of U.S. patent application Ser. No. 11/869,622, filed on Oct. 9, 2007, which is a continuation of U.S. patent application Ser. No. 11/146,288, now U.S. Pat. No. 7,298,726, filed on Jun. 6, 2005. The application Ser. No. 11/146,288 is a continuation of International Application No. PCT/CN03/00921, filed on Oct. 30, 2003. The International Application claims the benefit of priority from Chinese Patent Applications No. CN02154432.8, filed on Dec. 12, 2002. The Chinese Patent Applications No. CN02154432.8 claims the benefit of priority from Chinese Patent Applications No. CN02148379.5, filed on Nov. 12, 2002. All of the aforementioned patent applications are hereby incorporated by reference in their entireties.

FIELD OF THE TECHNOLOGY

The present application relates to user information processing, and more particularly, to a method for processing a service connection between a WLAN (Wireless Local Area Network) and a user terminal.

BACKGROUND OF THE APPLICATION

As the requirement for the wireless access rate is becoming higher and higher, the WLAN that can provide a higher wireless access rate within a smaller area has seen in fast development. Nowadays, there are many available technologies for WLAN, one widely applied technical standard of which is IEEE 802.11b that uses the frequency band of 2.4 GHz; another alternative that uses the same frequency band is the Bluetooth. All other new technologies, such as IEEE 802.11a and ETSI BRAN Hiperlan2, use the frequency band of 5 GHz.

Although there are many different kinds of radio access technologies, most WLANs are used to bear IP (Internet Protocol) data packets. In a wireless IP network, the WLAN access technology specific is usually transparent to the upper layer, e.g. IP layer or upper. All these IP networks are of the similar basic architecture which implements the wireless access of a user via the Access Point (AP) and builds an IP transmission network through the connection of the network control and connection devices.

Along with the springing up and development of the WLAN, how to implement the interworking between the WLAN and various mobile communication networks, such as GSM, CDMA (Code-Division Multiple Access) system, WCDMA (Wideband Code Division Multiple Access) system, TD-SCDMA (Time Division-Synchronize Code Division Multiple Access) system and CDMA2000 system, has become one of the highlights of current research. In the scope of $3^{rd}$ Generation Partnership Project (3GPP) standard organization, simplified network architecture for interworking between a WLAN system and a 3GPP system is shown in FIG. 1. A user terminal can communicate with not only the Internet and Intranet but also the packet domain network of the 3GPP network via WLAN access networks. It is obvious that, as a wireless access technology that provides IP bearer, the WLAN can be interconnected with many other networks.

Generally, while the WLAN connects with other networks, the authentication, authorization and accounting operation for the connection are controlled by an appropriate application server, for instance, the AAA (Authentication, Authorization and Accounting) server in a 3GPP system; and the subscriber information is managed by an information storage unit, for example, the HSS (Home Subscriber Server) or the HLR (Home Location Register) in the 3GPP system. Therefore, when the authentication, authorization and accounting processes is performed, the corresponding application server will request the user profile from the information storage unit, and store it temporarily in itself. The application server will not release the information stored until the service is terminated, wherein the so-called release refers to the step that the application server deletes the relevant data of the user who is not access the service any more. In specific implementation, the data can be deleted immediately after the user is offline, or be kept for a certain period of time before being deleted so that when the user logs in once again, the application server can use the stored data again without downloading it from the information storage unit. Once the subscriber information in the information storage unit is changed, the information storage unit will notify the corresponding application server to update the data.

In practice, there is no corresponding mechanism in the 3GPP standard supporting the attach process by which a WLAN user requests to access WLAN, i.e. the WLAN attach process. As a result, a WLAN user cannot know whether he/she has successfully accessed the WLAN, and whether he is able to use the services provided by the WLAN. In addition, the AAA server cannot determine whether the WLAN based services are available to the user. Similarly, there also is no corresponding mechanism in the 3GPP standard supporting the detach process by which a WLAN user stops using the services and is detached from the WLAN, i.e. the WLAN detach process. Consequently, the WLAN user cannot make sure whether he has successfully been detached from the WLAN, and furthermore, the AAA server is also unable to determine whether the user is still able to enjoy the WLAN based services.

In addition, in order to prevent unnecessary signaling delivery, it is necessary to synchronize the user information stored in the application server and that in the information storage unit. For instance, in existing specifications, when a user is attached or detached in a WLAN, the information about user connection can be updated only in the service control unit, i.e. the user information application server, such as the AAA server, without notification of the information storage unit for the user, such as the HLR/HSS. The direct consequence of this mechanism is that the information storage unit will not know the accurate status information of the user, which makes the user information stored in the information storage unit unreliable. It is also possible that even after the user's disconnection from a WLAN, the information storage unit continues to ask for the user information, such as the service connection status of the user and the user data, from the service control unit in subsequent processing, which results in unnecessary signaling burden and meaningless system resource occupation. When there is a large amount of such signaling, negative effects may be brought to the normal operations of the system.

SUMMARY

In view of the above, it is the primary object of the present application to provide a method for processing the user connection between the WLAN and the user terminal, by which the WLAN and the user terminal can confirm the current service connection status of the WLAN user terminal, in order to achieve effective interactions and controls between the WLAN user terminal and the service control unit.

Another object of the present application is to provide such a method for processing the service connection between the WLAN and the user terminal that can synchronize the user information stored in the user information storage unit and the user information in the service control unit so as to avoid redundant message delivery and further improve the efficiency of the system.

In order to achieve the above objects, the present application is implemented as follows:

A method for processing the user connection between the WLAN and the user terminal is applicable to a WLAN consisting of a WLAN user terminal, a WLAN access unit, a service control unit and a user information storage unit, the method comprising:

Setting flags in the user terminal and the service control unit of a WLAN respectively, which represent the status of the connection between the user terminal and the WLAN, e.g. attached or detached; establishing or canceling the connection between the user terminal and the WLAN by means of interaction between the WLAN user terminal and the WLAN, and meanwhile modifying the corresponding flags.

Wherein, the service control unit may be a 3GPP AAA Server and the user information storage unit can be a HSS or a HLR.

The step of establishing the connection between the user terminal and the network refers to attaching the WLAN user terminal to the WLAN, which further includes:

a11. when a WLAN user terminal accesses the WLAN, the WLAN user terminal sending an attach request message to the service control unit via the WLAN access unit;

a12. on receiving the attach request, the service control unit judging whether to allow the current WLAN user terminal to establish a service connection, if not, the service control unit denying the attach request sent by the user terminal and ending this procedure; otherwise, the service control unit recording the service connection status of the WLAN user terminal as WLAN attached, then returning an access response message to the WLAN user terminal.

Wherein, the attach request message in Step a11 contains a permanent or temporary identification of the WLAN user terminal. On receiving the attach request, the service control unit first determines whether the permanent or temporary identification of the user in the attach request message is valid. If not, the service control unit initiates a request procedure to the user terminal to fetch a valid flag of the user terminal; otherwise, the service control unit determines whether having stored in itself the user information of the user terminal that sent the current request. If there is no such information, the service control unit sends a request for the data information of the user terminal to the corresponding user information storage unit; otherwise, goes to Step a12 directly.

The determination on whether to allow the current WLAN user terminal to establish the service connection in Step a12 is implemented by the existing authentication procedure.

The method further includes: on receiving the access response message sent by the service control unit, the WLAN user terminal modifying the relevant service connection flag in itself, indicating that the service connection between the WLAN user terminal and the WLAN has been successfully established.

The step of canceling the service connection between the user terminal and the network refers to detaching the WLAN user terminal from the WLAN, the process of which further includes: the WLAN user terminal detaching from the WLAN, canceling the relevant service connection, and the service control unit recording the service connection of the WLAN user terminal as WLAN detached. The detach procedure can be an Explicit WLAN detach or an Implicit WLAN detach.

When the Explicit WLAN detach process is initiated by the WLAN user terminal, the method further comprises:

a21. the WLAN user terminal sending to the network a detach request that contains the reason that the WLAN user terminal is detached from the WLAN;

a22. on receiving the detach request, the service control unit recording the current service connection status of the WLAN user terminal as WLAN detached.

The detach process further comprises: the service control unit returning a response message to the WLAN user terminal, indicating that the WLAN user terminal has successfully been detached from the WLAN.

When the Explicit WLAN detach procedure is initiated by the WLAN, the method further comprises:

The service control unit sending to the WLAN user terminal a detach request that contains the reasons that the WLAN user terminal is detached from the WLAN; meanwhile, the service control unit recording the service connection status of the current WLAN user terminal as WLAN detached.

When the detach is an Implicit WLAN detach, the method further comprises: if there is no response from the WLAN user terminal after the WLAN initiates at least one contact operation with the WLAN user terminal, the service control unit directly recording the service connection status of the WLAN user terminal as WLAN detached. The process of Implicit WLAN detach further comprises: when the time during which there is no contact between the relevant WLAN user terminal and the WLAN exceeds a predetermined threshold, the WLAN initiating at least one contact process to contact with the WLAN user terminal.

The flags set in the WLAN user terminal and the service control unit can be new-defined specific flags or are implemented by re-using existing flags. The messages bearing the interactive procedures are implemented by new-defined specific messages or by re-using the messages in existing procedures.

The attach or detach procedure mentioned above further includes: setting a flag that indicates the service connection status between the WLAN user terminal and the WLAN in the user information storage unit; the service control unit sending a user-data updating instruction to the user information storage unit, after recording the service connection status of the current WLAN user terminal; the user information storage unit updating the service connection status of the current user terminal after receiving the instruction, and then returning a user data updating response to the service control unit after updating the user's service connection information.

Therefore, when the current service connection status of a user is changed to WLAN attached, the method further comprises:

c11. the service control unit setting the service connection status of the current WLAN user terminal as WLAN attached and simultaneously sending an attach request to the user information storage unit;

c12. on receiving the attach request, the user information storage unit setting the service connection status of the relevant WLAN user terminal as WLAN attached, and then returning a response message to the service control unit.

When the service connection status of a user is changed to WLAN detached, the method further comprises:

c21. the service control unit setting the service connection status of the current WLAN user terminal as WLAN detached, and simultaneously sending a detach request to the user information storage unit;

c22. on receiving the detach request, the user information storage unit sets the service connection status of the relevant WLAN user terminal as WLAN detached, and then returning a response message to the service control unit.

When the user information is changed to WLAN detached, the method may as well further comprises:

c31. the service control unit deleting the stored user data of the current WLAN user terminal, and simultaneously sending a user information delete request to the user information storage unit;

c32. on receiving the delete request, the user information storage unit recording that the user data of the current WLAN user terminal has been deleted from the service control unit, and then returning a response message to the service control unit.

Wherein deleting the user data in Step c31 comprises deleting the information of the WLAN user terminal from the service control unit immediately after the WLAN user terminal disconnects from the WLAN; or keeping, after the WLAN user terminal disconnects from the WLAN, the information of the WLAN user terminal in the service control unit for a certain period of time before deleting the information.

As described above, the method provided by this application for processing the service connection of a user in a WLAN clearly defines a WLAN attach procedure by which the WLAN user terminal accesses the WLAN and a WLAN detach procedure by which the WLAN user terminal detaches from the WLAN so as to enable the service connection status (attach or detach) of the WLAN user terminal to be controlled interactively and effectively at the user terminal and the service control unit. Moreover, the method makes it possible to clearly indicate whether the current user terminal has successfully connected to the network and been able to enjoy the WLAN based services; or whether the current user terminal has smoothly been detached from the WLAN and terminated the WLAN based services.

In addition, when the user accesses the WLAN or is detached from the WLAN, the user information storage unit or the service control unit will send relevant messages each other in time so as to update simultaneously the user data in both the user information storage unit and the service control unit. Using the method of the present application can avoid redundant signaling burden and unnecessary occupation of the system resource caused by the lost of synchronization of the user data, improve the working efficiency of the system and the effectiveness of message transmission, and further provide more convenient and diversified services for the WLAN user.

DETAILED DESCRIPTION

The present application will be described in detail hereinafter with references to the accompanying drawings and the preferred embodiments.

In view of the current WLAN technologies, the present application provides an interactive method for various parts relating to the information of user service connection, such as the service control unit and the user information storage unit to process changes of the statuses of the WLAN user service connection when the connection is changed. There are two kinds of service connections statuses between the user terminal and the network, attached and detached. The present application, by means of tracing the change in the service connection between the WLAN user and the service control unit which takes place when the WLAN user accesses to or disconnects from the WLAN, provides a method to enable both the user terminal and the WLAN to know whether the user has successfully accessed the WLAN and the WLAN service is available or whether the user terminal has successfully been disconnected from the WLAN and the WLAN service needs to be terminated.

Figure 1:
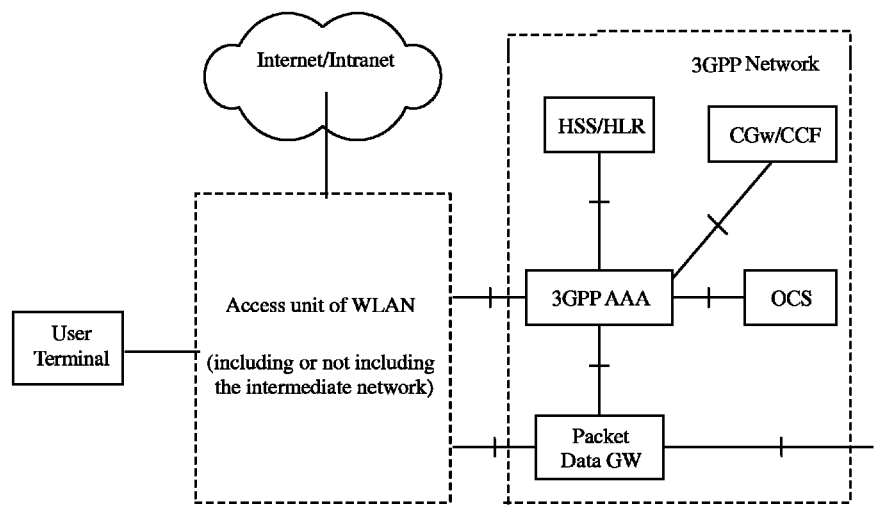
FIG. 1 shows a simplified network architecture for the interworking between the WLAN and 3GPP system.
Figure 2:
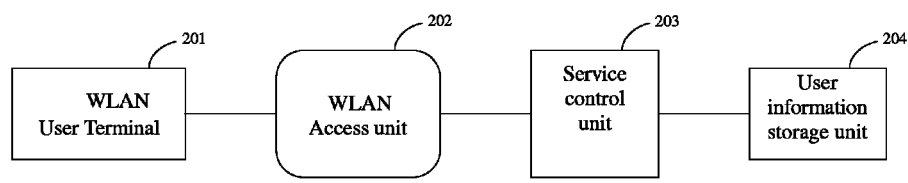
FIG. 2 shows the system structure in the WLAN for processing changes of the service connection between the user and the WLAN.

The structure of the WLAN system implementing the above interactive method proposed by the present application is shown in FIG. 2, comprising: a WLAN user terminal 201, a WLAN access unit 202, a service control unit 203 and a user information storage unit 204. The WLAN access unit 202 is responsible for the accessing and routing management of the user terminal, enabling the user terminals therein to communicate with each other using IP protocol and to connect and communicate with other IP networks. Generally speaking, the WLAN access unit mainly comprises Access Points (AP) and Access Controllers (AC), and may also comprises routers for providing the network connectivity and relevant servers for network control. The service control unit 203, which functions as a user control center in the WLAN system, controls the users' access to the WLAN by means of authentication, and accounts for every user terminal in the network. This service control unit can be a subscription information application unit. In practical applications, the AAA server is one example of the service control unit. The user information storage unit 204 is used for storing the information of all users and can be implemented by the HSS/HLR.

Figure 3:
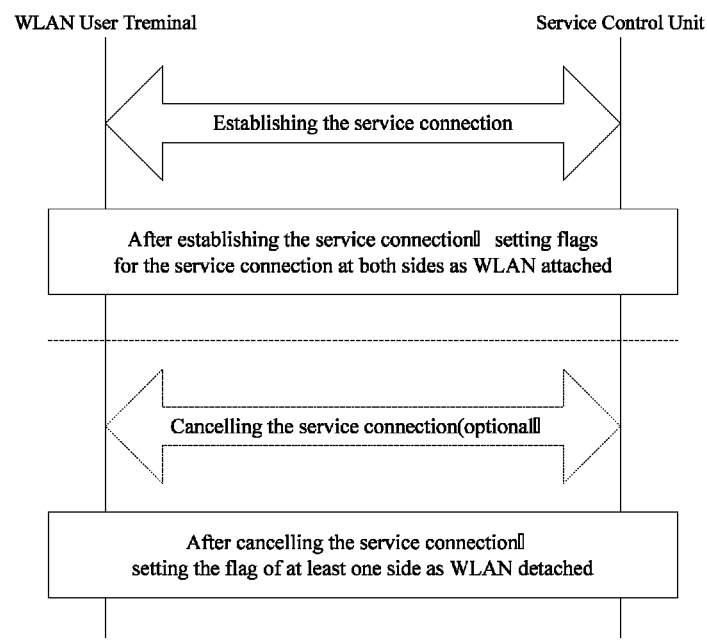
FIG. 3 shows a flowchart for implementing the method in accordance with the present application.

The implementation process of the method in the present application is shown in FIG. 3, which comprises the steps of:

Presetting, respectively in the WLAN user terminal and the service control unit, flags that represent the attached or detached status of the service connection between the user terminal and WLAN. The flags can be new-defined specific flags or can be implemented by re-using the flags that have already existed in the user terminal or the service control unit.

a. Perform the attach procedure when a service connection between the WLAN user terminal and the WLAN is to be established and set the flags in the WLAN user terminal and the service control unit as WLAN attached after the WLAN user has successfully attached the WLAN.

b. Cancel the service connection between the user terminal and the network through the interactions between the WLAN user terminal and the WLAN when the WLAN user terminal detaches from the WLAN and simultaneously modify the relevant flags. It is also possible to modify the flags of the service connection without the interactive procedure; for instance, when the wireless connection is interrupted resulting in that the connection is unable to be established, the WLAN user terminal can directly set the flag of the service connection as WLAN detached.

The causes for canceling the service connection between the WLAN user terminal and the network without notifying the network may also include an exceptional power off of the user terminal, a direct plug-off of the WLAN card from the computer, or a crashing down of the system, etc. The network will also set the flag of the service connection between the user and the WLAN as WLAN detached after detecting that it is unable to connect with the user terminal.

Take the AAA server as an example of the service control unit. When a user terminal accesses the WLAN, the AAA server determines whether there is the user's information in itself. If there is no such information, the AAA server downloads the relevant user data from the user information storage unit (e.g. HSS/HLR) and stores it. After the user has been successfully authenticated, the AAA server records the service connection status between the current user and the WLAN as WLAN attached, and at the same time sends a corresponding instruction to the user, indicating that the user has already attached to the WLAN. The user terminal then indicates that the WLAN based services are available through the proper change of the service connection or the corresponding flag.

Figure 4:
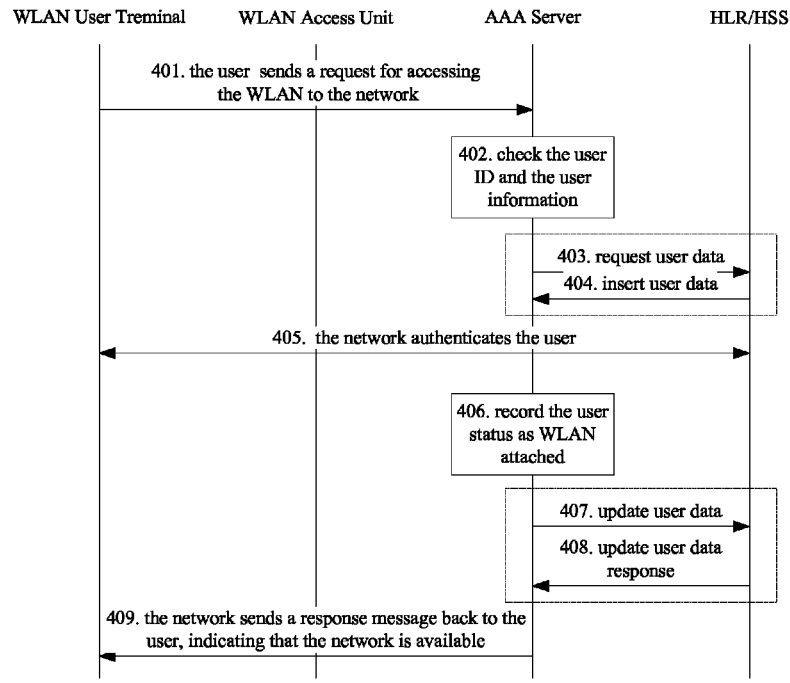
FIG. 4 shows a flowchart of the interactive procedure when a user accesses the WLAN.

The WLAN attach procedure of the user terminal is shown in FIG. 4. In this embodiment, the HSS/HLR acts as a user information storage unit. The procedure comprises the following steps:

Step 401: Establish a wireless connection between the user terminal and the WLAN when the user needs to access the WLAN. After the wireless connection is successfully established, the WLAN user terminal sends a WLAN access request to the AAA server through the WLAN access unit. The request needs to identify clearly the type of network the user requests to access is a WLAN and to contain a permanent or temporary identification of the user.

Step 402: On receiving the request, the AAA server determines if there is a permanent or temporary identification in the access request message sent from the user terminal. If not, the network needs to initiate a request procedure to the user terminal to obtain the valid identification of the user terminal; otherwise, the AAA server continues to determine whether there is in itself the user information of the user terminal that sends the request. If there is no such information in the AAA server, go to Step 403; otherwise, go to Step 405 directly.

Steps 403~404: The AAA server sends a request to the relevant HLR/HSS for the data of the user terminal; and the HLR/HSS sends the data of user terminal to the AAA server.

Step 405: The WLAN initiates an authentication procedure for the current WLAN user terminal.

Step 406: After the authentication procedure completes successfully, the AAA server records the service connection between the user and the WLAN as WLAN attached, and then go to Step 407; if the authentication procedure fails, the AAA server denies the access request of the user and ends the procedure.

Steps 407~408: The AAA server sends a user data updating request to the HLR/HSS, and the HLR/HSS updates user status information of the current WLAN user terminal; after the updating process, the HLR/HSS sends a data updating response message to the AAA server. This step can be optional to avoid frequent updating of the user service connection status information in the HLR/HSS.

Step 409: The AAA server returns an access response message to the WLAN user, indicating that the user has already been attached to the WLAN and the WLAN is available. On receiving the message, the user terminal needs to modify the relevant flag, indicating that the WLAN service is available. For example, a flag of the WLAN service connection can be set and is switched to the active status at the moment.

The WLAN detach procedure of a user terminal falls into two groups depending on the detaching mode: Explicit WLAN detach and Implicit WLAN detach. The Explicit WLAN detach can be further divided into two subgroups based on the initiator: the Explicit WLAN detach initiated by the WLAN user terminal, and that initiated by the WLAN. In an Explicit WLAN detach procedure initiated by a user terminal, the user terminal needs to identify the reason for the detachment in the detach request message sent to the WLAN; similarly, in an Explicit WLAN detach procedure initiated by the WLAN, it is also necessary for the network to identify the reason for the detachment in the detach request message sent to the user. On the other hand, the Implicit WALN detach procedure is initiated by the network performed when the user has not contacted with the WLAN for a long time. In this case, the network does not need to inform the user terminal after the detach procedure is completed.

Figure 5:
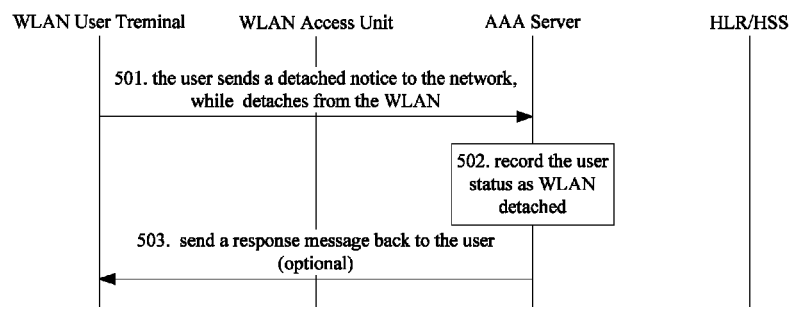
FIG. 5 shows a flowchart of the interactive procedure of the Explicit WLAN detach initiated by a user terminal.

Hereinafter is the detailed description on the above mentioned modes of the detach procedures:

1) When it is the WLAN user terminal that initiates a detach procedure from the WLAN, the user terminal informs the AAA server to terminate the WLAN service, and the service control unit, i.e. the AAA server, updates the corresponding service connection status to WLAN detached. As shown in FIG. 5, the procedure comprises the following steps:

Step 501: When a WLAN user terminal requests to detach from the WLAN, the WLAN user terminal sends a detach request to the network. The request message contains the reason for the detachment as well as the type of the network the WLAN user terminal detaches from, i.e. WLAN.

Step 502: On receiving the detach request, the AAA server records the service connection status of the user terminal as WLAN detached.

Step 503: The AAA server returns a response message to the current WLAN user terminal. This step is optional, the AAA server may decide based on the actual situation whether or not to return to the user terminal the response message, indicating that the user has already detached from the WLAN. For instance, it may be only needed to set the corresponding flags in the AAA server and the HLR/HSS in a WLAN detach procedure while not necessary to inform the user terminal for the convenience of operation and maintenance. Moreover, the AAA server will change the service connection status to WLAN detached when detecting there is no response sent by the user terminal. At this time, the AAA server does not need to send the notification to the user terminal, but simply sets the flag of the service connection status as WLAN detached.

Figure 6:
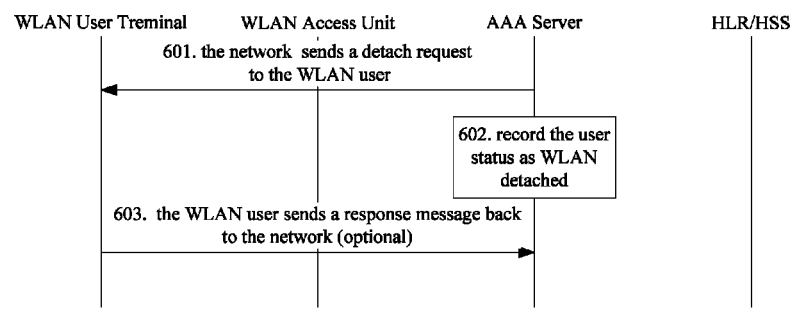
FIG. 6 shows a flowchart of the interactive procedure of the Explicit WLAN detach initiated by the WLAN.

2) It is possible for the WLAN to initiate a WLAN detach procedure for a user out of a reason from the network. In this case, the detach procedure may be initiated by the AAA server or the HSS/HLR. In this embodiment, the procedure is initiated by the AAA server, and the AAA server updates the relevant service connection status of the current user terminal to WLAN detached. As shown in FIG. 6, the procedure comprises the following steps:

Step 601: When the WLAN requests the WLAN user terminal to detach from the WLAN, the AAA server sends a detach request to the user terminal. The request message contains the type of the network to be detached from, i.e. WLAN as well as the reason for the detachment.

Step 602: Simultaneously, the AAA server records the service connection status of the WLAN user terminal as WLAN detached.

Step 603: The current WLAN user terminal returns a response message to the AAA server, indicating the user has already detached from the WLAN and the WLAN based service for the user has been terminated. This step is optional. The user terminal may decide based on the actual situation whether or not to return the response message to the AAA server.

Figure 7:
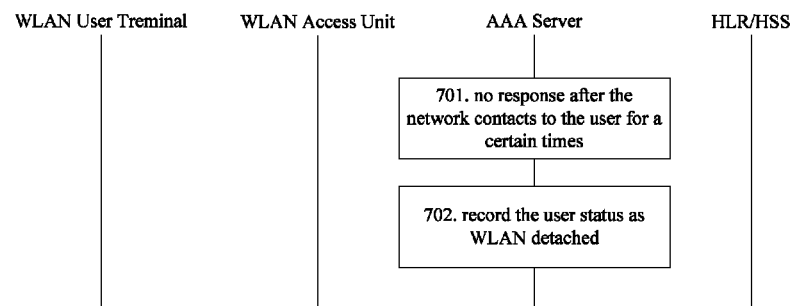
FIG. 7 shows a flowchart of the interactive procedure of the Implicit WLAN detach initiated by the WLAN.

3) Implicit WLAN detach procedure. When the user has not contacted with the WLAN for a long time, a WLAN detach procedure will be initiated by the AAA server. The AAA server will update the WLAN service connection status of the user to WLAN detached, indicating that the WLAN service is no longer available to the user. In this case, the AAA server does not need to send any notification to the user. As shown in FIG. 7, the procedure comprises the following steps:

Steps 701~702: After the AAA server has initiated a certain times of contacts with the WLAN user terminal, if there is still no response from the user terminal, the AAA server will directly record the service connection status of the WLAN user terminal as WALN detached. The times of contacts initiated by the AAA server before a detach procedure can be configured according to the actual situation. There are many reasons that the AAA server may initiate contacts with the user terminal: it may be that the user has not contacted with the WLAN for a long time, then relevant timer in AAA server is expired, which may result in the AAA server initiating the contact procedure with the user terminal. Other user applications may also request the AAA server to contact with the user terminal.

In the Implicit and Explicit WLAN detach procedure mentioned above, in order to guarantee that the data in the service control unit and in the user information storage unit are consistent, the service control unit will perform the detach procedures in two ways: (1) records the service connection status of user as WLAN detached, sends a user detach notification to the user information storage unit, and then the user information storage unit sets a corresponding flag for the current service connection status of the user; (2) directly deletes the user information without setting a flag for the service connection of the user, sends a notification to the user information storage unit indicating that the user information has been deleted, and then the user information storage unit records that the user information has been deleted in the service control unit.

Figure 8:
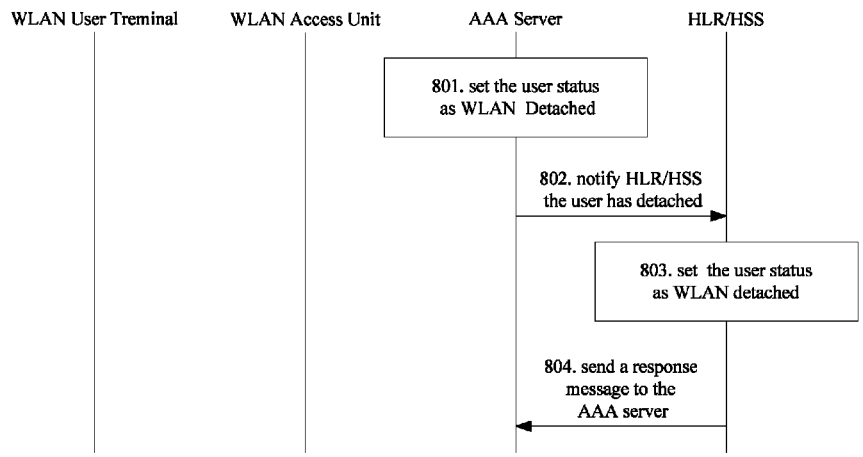
FIG. 8 shows an embodiment of the interactive operation between the service control unit and the user information storage unit in a WLAN detach process according to the present application.

The interactive process between the service control unit and the user information storage unit based on the method (1) is shown in FIG. 8, comprising the following steps:

Steps 801~802: While performing the detach procedure, the AAA server sets the current service connection status of the user terminal as WLAN detached and sends a detach notification to the HSS/HLR simultaneously, indicating that the user has been detached from the WLAN;

Steps 803~804: On receiving the notification, the HSS/HLR sets the current service connection status of the relevant user terminal as WLAN detached, then returns a response message to the AAA server, indicating that the service connection status of the user has been correctly updated.

Figure 9:
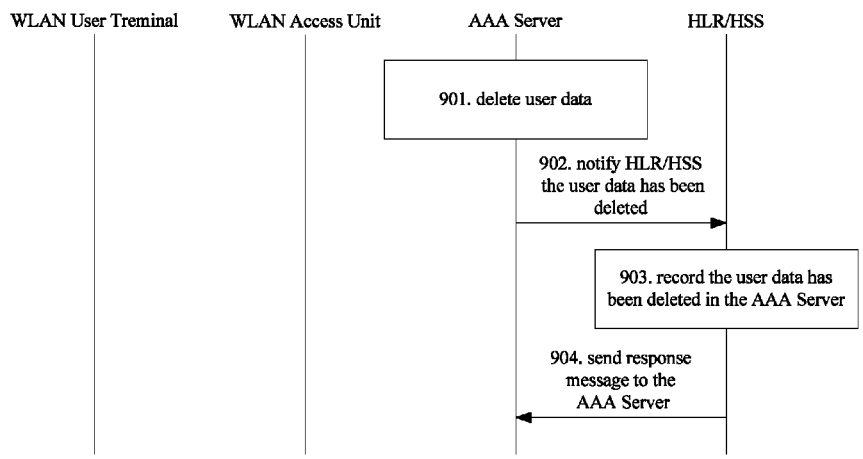
FIG. 9 shows another embodiment of the interactive operation between the service control unit and the user information storage unit in a WLAN detach process according to the present application.

The interactive process between the service control unit and the user information storage unit based on the method (2) is shown in FIG. 9, comprising the following steps:

Steps 901~902: While performing the detach procedure, the AAA server deletes the user data of the user terminal stored in itself and sends a user information delete notification to the HSS/HLR simultaneously, indicating that the data of the user terminal has been deleted in the AAA server;

Steps 903~904: On receiving the notification, the HSS/HLR records that the user data of the corresponding WLAN user terminal has been deleted from the AAA server, then returns a response message to the AAA server, indicating that the HSS/HLR has set a flag indicating the user data has been deleted.

In the attach or detach procedure mentioned above, it is also necessary for the user information storage unit to preset a flag representing the service connection status between the WLAN user terminal and the WLAN.

The messages to support the above various interactive procedures can be implemented by new-defined specific messages, for example, defined by Mobile Application Part (MAP) protocol, Remote Authentication Dial in User Service (RADIUS) protocol, or DIAMETER protocol. The interactive procedure can also be implemented by adding parameters to the existing messages. The user information mentioned in the above solutions could be the Subscription Information.

In summary, the above description is only preferable embodiments of the present application and is not to be construed as limits to the protection scope of the present application.

The invention claimed is:

1. A method for indicating a service connection status of a user terminal, wherein a service connection is between the user terminal and a Wireless Local Area Network (WLAN), comprising:

sending, by a service control unit, a detach request to the user terminal, wherein the detach request includes at least one reason about why the user terminal is to be detached from the WLAN;

updating, by the service control unit, a first flag set in the service control unit indicating the service connection status of the user terminal as WLAN detached;

sending, by the service control unit, a user data updating instruction indicating the service connection status to a user information storage unit; and receiving, by the service control unit, a user data updating response returned from the user information storage unit after the user information storage unit updating a second flag set in the user information storage unit on receiving the user data updating instruction, wherein the second flag indicates the service connection status between the user terminal and the WLAN.

2. The method according to claim 1, the method further comprises:
deleting, by the service control unit, the user data of the WLAN user terminal stored in the service control unit and sending a user information delete notification to the user information storage unit; and
recording, by the user information storage unit, that the user data of the user terminal has been deleted from the service control unit, and then returning a response message to the service control unit.

3. The method according to claim 2, wherein the deleting the user data comprises:
deleting information of the user terminal from the service control unit immediately after the user terminal is disconnected from the WLAN.

4. The method according to claim 2, wherein the deleting the user data comprises:
keeping, after the user terminal is disconnected from the WLAN, the information of the user terminal in the service control unit for a set period of time before deleting the information.

5. The method according to claim 1, wherein the first flag set in the service control unit is a newly-defined flag or a flag using an existing format.

6. The method according to claim 1, wherein the service control unit is an Authentication, Authorization and Accounting (AAA) server.

7. The method according to claim 1, wherein the user information storage unit is a Home Subscriber Server (HSS) or a Home Location Register (HLR).

8. The method according to claim 1, further comprising: setting a third flag, in the user terminal, to represent the service connection status of the user terminal, wherein the service connection status is either a WLAN attached status or a WLAN detached status.

9. The method according to claim 1, further comprising:
after receiving the detach request, detaching, by the user terminal, from the WLAN according to the detach request.

10. The method according to claim 1, further comprising:
after receiving the detach request, sending, by the user terminal, to the service control unit a response indicating that the user terminal is to be detached from the WLAN.

11. A Wireless communication system, comprising:
a service control unit having a processor and configured to control a service connection between a user terminal and a Wireless Local Area Network (WLAN), and
a user information storage unit having a processor and configured to store information related to the user terminal,
wherein the service control unit is configured to send a detach request to the user terminal, wherein the detach request includes at least one reason about why the user terminal is to be detached from the WLAN, update a first flag set in the service control unit indicating a service connection status of the user terminal as WLAN detached and send a user data updating instruction indicating the service connection status to the user information storage unit;
wherein the user information storage unit is configured to receive the user data updating instruction, update a second flag set in the user information storage unit on receiving the user data updating instruction, wherein the second flag indicates the service connection status between the user terminal and the WLAN, and send a user data updating response to the service control unit.

12. The system according to claim 11, wherein the service control unit is an Authentication, Authorization and Accounting (AAA) server of a 3rd Generation Partnership Project (3GPP) network.

13. The system according to claim 11, wherein the user information storage unit is a Home Subscriber Server (HSS) or a Home Location Register (HLR).

14. A non-transitory computer readable medium containing codes for indicating a service connection status of a user terminal, which when executed by a processor of a service control unit causes the service control unit to perform the following:
sending a detach request to the user terminal, wherein the detach request includes at least one reason why the user terminal is to be detached from the WLAN;
updating a first flag set in the service control unit to indicate the service connection status of the user terminal as WLAN detached;
sending a user data updating instruction to indicate the service connection status to a user information storage unit; and
receiving a user data updating response returned from the user information storage unit after the user information storage unit updating a second flag set in the user information storage unit upon receiving the user data updating instruction, wherein the second flag indicates the service connection status between the user terminal and the WLAN.

* * * * *